US009336959B2

(12) United States Patent
Kato et al.

(10) Patent No.: US 9,336,959 B2
(45) Date of Patent: May 10, 2016

(54) COLLECTOR, ELECTRODE STRUCTURE, NON-AQUEOUS ELECTROLYTE CELL, AND ELECTRICAL STORAGE DEVICE

(75) Inventors: Osamu Kato, Chiyoda-ku (JP); Sohei Saito, Chiyoda-ku (JP); Yukiou Honkawa, Chiyoda-ku (JP); Mitsuyuki Wasamoto, Chuo-ku (JP); Kenichi Kadowaki, Chuo-ku (JP); Satoshi Yamabe, Chuo-ku (JP)

(73) Assignees: UACJ Corporation, Tokyo (JP); UACJ Foil Corporation, Tokyo (JP)

( * ) Notice: Subject to any disclaimer, the term of this patent is extended or adjusted under 35 U.S.C. 154(b) by 158 days.

(21) Appl. No.: 14/235,782

(22) PCT Filed: Jul. 27, 2012

(86) PCT No.: PCT/JP2012/069123
§ 371 (c)(1),
(2), (4) Date: Jan. 28, 2014

(87) PCT Pub. No.: WO2013/018688
PCT Pub. Date: Feb. 7, 2013

(65) Prior Publication Data
US 2014/0170488 A1 Jun. 19, 2014

(30) Foreign Application Priority Data

Jul. 29, 2011 (JP) ................. 2011-166732

(51) Int. Cl.
*H01M 4/13* (2010.01)
*H01G 11/68* (2013.01)
*H01M 4/66* (2006.01)
*H01G 11/28* (2013.01)
*H01G 11/70* (2013.01)

(52) U.S. Cl.
CPC .............. *H01G 11/68* (2013.01); *H01G 11/28* (2013.01); *H01M 4/663* (2013.01); *H01M 4/667* (2013.01); *H01M 4/668* (2013.01); *H01G 11/70* (2013.01); *H01M 4/13* (2013.01); *Y02E 60/13* (2013.01)

(58) Field of Classification Search
CPC ..... H01M 4/663; H01M 4/667; H01M 4/668; H01M 4/13; H01G 11/68; H01G 11/28
See application file for complete search history.

(56) References Cited

U.S. PATENT DOCUMENTS

| 2005/0103229 | A1 | 5/2005 | Tanaka |
| 2007/0109722 | A1 | 5/2007 | Ohmori |
| 2009/0029255 | A1 | 1/2009 | Ohmori |
| 2009/0257171 | A1* | 10/2009 | Yamazaki et al. ............ 361/502 |

FOREIGN PATENT DOCUMENTS

| EP | 2 048 726 A1 | 4/2009 |
| JP | 2002-105241 A | 4/2002 |
| JP | 2007-226969 A | 9/2007 |
| JP | 2008-060060 A | 3/2008 |
| JP | 2009-277660 A | 11/2009 |
| JP | 2009272454 | * 11/2009 |
| JP | 2011-034891 A | 2/2011 |
| JP | 2011-086455 A | 4/2011 |
| WO | 2006/085691 A1 | 8/2006 |

OTHER PUBLICATIONS

Extended European Search Report dated Aug. 8, 2014, issued in corresponding Japanese Application No. 12819513.8, filed Jul. 29, 2011, 4 pages.
International Search Report mailed Sep. 25, 2012, issued in corresponding International Application No. PCT/JP2012/069123, filed Jul. 27, 2012, 2 pages.

* cited by examiner

*Primary Examiner* — Ula C Ruddock
*Assistant Examiner* — Thomas Parsons
(74) *Attorney, Agent, or Firm* — Christensen O'Connor Johnson Kindness PLLC

(57) ABSTRACT

An object of the present invention is to provide a current collector which can decrease the internal resistance of a non-aqueous electrolyte battery, be used suitably for a non-aqueous electrolyte battery such as a lithium ion secondary battery and the like or for an electrical storage device such as a lithium ion capacitor and the like, and improve high rate characteristics. According to the present invention, a current collector which is structured by forming a resin layer possessing conductivity on at least one side of a conductive substrate is provided. The resin layer contains a chitosan-based resin and a conductive material, and the water contact angle of the surface of the resin layer measured by $\theta/2$ method in a thermostatic chamber at 23° C. is 5 degrees or more and 60 degrees or less. In addition, an electrode structure, a non-aqueous electrolyte battery, and an electrical storage device which use the current collector are provided.

9 Claims, 1 Drawing Sheet

COLLECTOR, ELECTRODE STRUCTURE, NON-AQUEOUS ELECTROLYTE CELL, AND ELECTRICAL STORAGE DEVICE

TECHNICAL FIELD

The present invention relates to a current collector, an electrode structure, a non-aqueous electrolyte battery, and an electrical storage device (an electrical double layer capacitor, a lithium ion capacitor and the like) that are suitable for charge and discharge at a large current density.

BACKGROUND ART

Conventionally, a non-aqueous electrolyte battery as represented by a lithium ion battery has been receiving a demand for reduction in charging time. In order to meet such demand, the battery must be capable of being charged with a large current density. In particular, a non-aqueous electrolyte battery for automobiles have been receiving a demand for the ability to discharge at a large current density, in order to provide the automobile with sufficient accelerating property. When conducting charge and discharge at a large current density, decrease in the internal resistance of the battery is important to improve the characteristics of maintaining battery capacity (high rate characteristics). The internal resistance includes an interface resistance between the constituting components, a transfer resistance of ions, which are the charged particles in the electrolyte solution, and the like. Here, it is necessary to decrease them. Among these, one of the most important internal resistance is the interface resistance. It has been known that one measure to decrease the interface resistance is to improve the adhesion between the constituting components.

For example, in order to improve the adhesion between the current collector and the active material layer, a technique in which the current collector is obtained by coating a metal foil with a conductive resin has been conventionally proposed. Patent Literature 1 discloses a technique to coat a metal foil with hydroxyalkyl chitosan.

CITATION LIST

Patent Literature

[Patent Literature 1] JP2008-60060A

SUMMARY OF INVENTION

Technical Problem

However, when the inventors of the present invention conducted the experiments in accordance with the technique disclosed in Patent Literature 1, there were cases where sufficient high rate characteristics cannot always be obtained.

The present invention has been made in consideration of the afore-mentioned problems. An object of the present invention is to provide a current collector which can decrease the internal resistance of a non-aqueous electrolyte battery, be used suitably for a non-aqueous electrolyte battery such as a lithium ion secondary battery and the like or for an electrical storage device such as a lithium ion capacitor and the like, and improve high rate characteristics.

Solution to Problem

By using the following current collector, a non-aqueous electrolyte battery and an electrical storage device such as an electrical double layer capacitor, lithium ion capacitor and the like, with superior high rate characteristics, can be obtained.

That is, according to the present invention, a current collector which is structured by forming a resin layer possessing conductivity on at least one side of a conductive substrate is provided. The resin layer contains a chitosan-based resin and a conductive material, and the water contact angle of the surface of the resin layer measured by θ/2 method in a thermostatic chamber at 23° C. is 5 degrees or more and 60 degrees or less. In addition, an electrode structure, a non-aqueous electrolyte battery, and an electrical storage device (ex.: electrical double layer capacitor or a lithium ion capacitor) are provided.

The inventors of the present invention have conducted an earnest study to improve the high rate characteristics of a non-aqueous electrolyte battery and the like, and have found that the water contact angle of the surface of the resin is strongly correlated with the high rate characteristics. In addition, the inventors have found that the high rate characteristics is especially superior when the water contact angle is 5 degrees or more and 60 degrees or less, thereby leading to completion of the invention.

The present invention was established from two findings. The first finding is that when the water contact angle is 60 degrees or less, the high rate characteristics is superior. The contact angle is one indicator which shows the degree of adhesion between different materials. The smaller the contact angle is, the higher the adhesion between the materials is. Therefore, when the contact angle is at or less than 60 degrees, the adhesion between the conductive substrate and the resin layer, and the adhesion between the resin layer and the active material layer become high, achieving superior high rate characteristics.

Another finding is that when the water contact angle is 5 degrees or more, the high rate characteristics is superior. As mentioned above, the contact angle is one indicator which shows the degree of adhesion between different materials, and thus the adhesion between the different materials becomes high as the contact angle becomes small. The inventors of the present invention have at first thought that there is no lower limit to the preferable range of the water contact angle, which means that the smaller the water contact angle is, the adhesion between the different materials would increase, achieving improvement in high rate characteristics. However, the inventors have surprisingly found that when the water contact angle is less than 5 degrees, the high rate characteristics worsens. The reasons why such results were obtained is currently under investigation and thus is not clear, however, it is assumed that when the water contact angle is too small, the adhesion between the conductive substrate and the resin layer worsens.

Here, the water contact angle of the resin layer is not uniquely-defined by the composition of the resin layer, and varies largely when the method for forming the resin layer varies. The inventors of the present invention have actually conducted experiments and found that even when the resin material has the same composition, variation of drying temperature, drying time, and drying method resulted in a large variation of the water contact angle of the resin layer. For example, it became apparent that even when the resin composition and the drying temperature is known, the mere change in the manufacturing conditions such as the drying time would vary the water contact angle, and thus it is important to determine the water contact angle in the present invention.

DESCRIPTION OF EMBODIMENTS

Hereinafter, the current collector according to one embodiment of the present invention will be explained with reference to FIG. 1.

Figure 1:
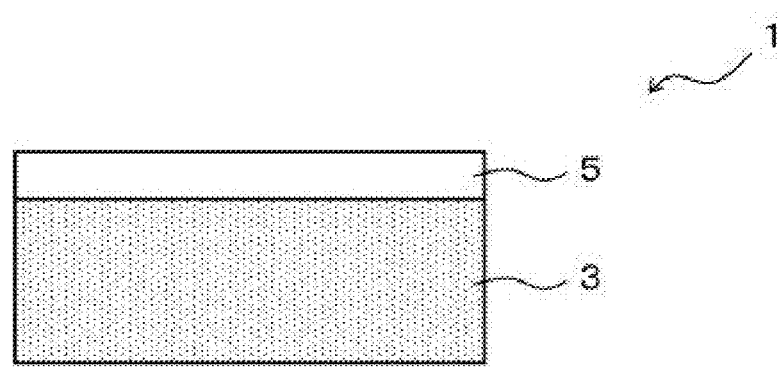
FIG. 1 is a cross-sectional view showing a constitution of the current collector according to one embodiment of the present invention.

As shown in FIG. 1, the current collector 1 of the present invention comprises a conductive substrate 3 provided with a resin layer (resin layer for current collector) 5 possessing electrical conductivity on at least one side of the conductive substrate 3. The resin layer 5 contains a chitosan-based resin and a conductive material, and the water contact angle of the surface of the resin layer 5 measured by θ/2 method in a thermostatic chamber at 23° C. is 5 degrees or more and 60 degrees or less.

Figure 2:
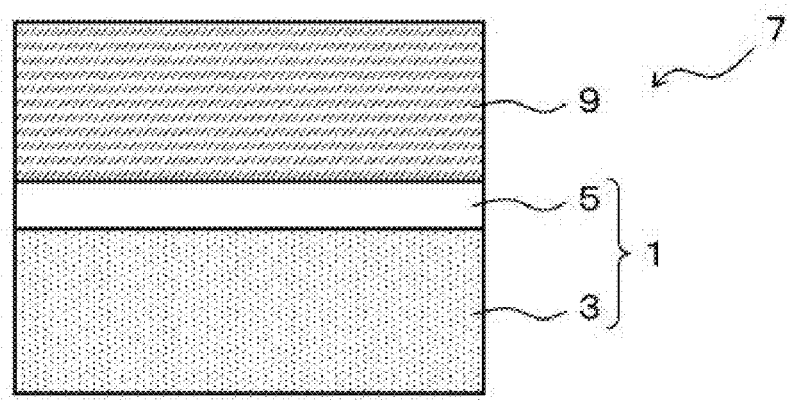
FIG. 2 is a cross-sectional view showing a constitution of an electrode structure formed by using the current collector according to one embodiment of the present invention.

In addition, as shown in FIG. 2, an electrode structure 7 can be formed by forming an active material layer or an electrode material layer 9 on the resin layer 5 of the current collector 1. The electrode structure 7 thus formed is suitable for a non-aqueous electrolyte battery, an electrical double layer capacitor, or a lithium ion capacitor.

Hereinafter, each of the constituting components will be described in detail.

(1) Conductive Substrate

As the conductive substrate of the present invention, various metal foils for a non-aqueous electrolyte battery, an electrical double layer capacitor, or a lithium ion capacitor can be used. In particular, aluminum, aluminum alloy, copper, stainless steel, nickel and the like can be used. From the viewpoint of the balance between the conductivity and cost, aluminum, aluminum alloy, and copper are preferable. When the aluminum foil is used for the positive electrode, 1000 series and 3000 series can be widely used. However, since the present invention is aimed to achieve high rate characteristics, pure aluminum series with high conductivity, such as JIS A1085 is preferably used. The thickness of the conductive substrate is not particularly limited. Here, it is preferably 0.5 μm or more, and 50 μm or less. When the thickness is less than 0.5 μm, the strength of the foil is insufficient, and thus there are cases where the formation of the resin layer and the like becomes difficult. On the other hand, when the thickness exceeds 50 μm, the other constitution elements, especially the active material layer or the electrode material layer need be made thin for such excess. Accordingly, when a non-aqueous electrolyte battery, and an electrical storage device such as an electrical double layer capacitor or a lithium ion capacitor are made, sufficient battery capacity may not be obtained.

(2) Conductive Resin Layer

In the present invention, a resin layer added with a conductive material is formed on the conductive substrate. There is no limitation with respect to the method of forming the conductive resin layer, however, it is preferable to coat a solution, dispersion, paste of the like of the resin onto the conductive substrate. As the method for coating, a roll coater, a gravure coater, a slit dye coater and the like can be used. The resin used in the present invention must be a chitosan-based resin. From the investigation made by measuring the volume resistivity of the resin layer by adding conductive material to various resins, it became apparent that when the resin with regulated water contact angle is used, sufficiently low resistance can be obtained. Here, it is assumed that the difference in the resistance is due to the difference in the distribution state of the conductive material in the resin which depends on the type of resin used. Such difference in the distribution state and the regulation of the water contact angle seems to provide the difference in the resistance.

<Chitosan-Based Resin>

In the present invention, the chitosan-based resin is a resin including a chitosan derivative as the resin component. As the chitosan-based resin, a resin including a chitosan derivative by 100 mass % can be used, however, other resin component can be used in combination. When the other resin is used in combination, it is preferable that the chitosan derivative is contained by 50 mass % or higher, more preferably 80 mass % or higher with respect to the total resin component. Preferable chitosan derivative is, for example, hydroxy alkyl chitosan, more particularly hydroxyl ethyl chitosan, hydoroxy propyl chitosan, hydroxyl butyl chitosan, grycerylated chitosan. Grycerylated chitosan is particularly preferable.

The chitosan-based resin preferably contains an organic acid. As the organic acid, pyromellitic acid, terephthalic acid and the like can be mentioned. The amount of the organic acid added is preferably 20 to 300 parts by mass with respect to the 100 parts by mass of the chitosan derivative, and is more preferably 50 to 150 parts by mass. When the amount of organic acid added is too small, the hardening of the chitosan derivative becomes insufficient. When the amount of organic acid added is too large, flexibility of the resin layer degrades.

The weight average molecular weight of the chitosan derivative is, for example, 30,000 to 500,000, particularly for example 30,000, 40,000, 50,000, 60,000, 70,000, 80,000, 90,000, 100,000, 150,000, 200,000 or 500,000. The weight average molecular weight may be in the range of two values selected from the values exemplified above. The weight average molecular weight is obtained by GPC (gel permeation chromatography).

<Conductive Material>

The conductive resin layer of the present invention is provided in between the conductive substrate and the active material layer of the electrode material layer. The conductive resin layer functions as a pathway of electrons which moves between the conductive substrate and the active material layer of the electrode material layer, and thus electron conductivity is required. Since the soluble nitrocellulose-based resin itself is high in insulation properties, conductive material must be formulated in order to impart the electron conductivity. As the conductive material used in the present invention, publicly known carbon powder, metal powder and the like can be used. Here, among them, carbon powder is preferable. As the carbon powder, acetylene black, Ketjen black, furnace black, carbon nanotube and the like can be used. The amount of the conductive material added is preferably 30 to 100 parts by mass, more preferably 50 to 80 parts by mass with respect to 100 parts by mass of the resin component of the resin layer. When the added amount is less than 50 parts by mass, the volume resistivity of the resin layer becomes high, and when the added amount exceeds 80 parts by mass, the adhesion with the conductive substrate lowers. Conventional methods can be used to disperse the conductive material in the resin component solution of the soluble nitrocellulose-based resin. For example, the conductive material can be dispersed by using a planetary mixer, a ball mill, a homogenizer, and the like.

The water contact angle of the surface of the resin layer of the present invention is required to be 5 degrees or more and 60 degrees or less. When the conductive material is merely added to the resin to form the resin layer, there are cases where sufficient adhesion at the interface of the conductive substrate and the resin layer, interface of the resin layer and the active material layer, or the interface of the resin layer and the electrode material layer cannot be obtained. This is since the state of the resin layer changes, depending on the type of the resin and the conditions for forming the resin layer, although being the chitosan-based resin. Here, contact angle, which shows the wettability of a liquid, is a surface texture that possesses a large influence to the adhesion. Therefore, by obtaining the contact angle of water, which has relatively large surface tension, adhesion of the current collector and active material layer of the electrode material layer formed thereon can be evaluated. In this case, regarding the resin layer and the water contact angle, it may seem that the smaller the water contact angle is, the more the adhesion improves, and the more the discharge rate can be improved. However, when the contact angle is too small, there is a possibility that adverse effect is caused on the adhesion of the conductive substrate and on the discharge rate characteristics. Therefore, it is necessary to regulate the water contact angle in the present invention. This issue will also be discussed later.

In the present specification, water contact angle is a value obtained by θ/2 method in a thermostatic chamber at 23° C. The water contact angle can be obtained by using a contact angle meter. After forming a resin layer on the current collector, a few micro liters of pure water is adhered as a droplet onto its surface, and then the water contact angle is measured. Since the surface tension of the water varies by the change in temperature, the water contact angle is measured in a thermostatic chamber at 23° C.

As a result of measuring the water contact angle by forming resin layers in accordance with various conditions, it became apparent that when the water contact angle is 60 degrees or less, sufficient adhesion with the active material layer and the electrode material layer can be obtained. In addition, as a result of conducting an investigation on the relation between the conductive substrate and the adhesion of the resin layer by forming resin layers having a different water contact angle, it became apparent that when the water contact angle of the surface of the resin layer is less than 5 degrees, the high rate characteristics become inferior. The reasons for such results are not clear, however, it is assumed that such difference is due to the subtle difference in the adhesion state of the conductive substrate and the resin layer. Therefore, it is necessary that the water contact angle is 5 degrees or more. In addition, when the water contact angle is 15 degrees or more and 40 degrees or less, the high rate characteristics is surprisingly superior. Therefore, the water contact angle of 15 degrees or more and 40 degrees or less is particularly preferable.

As described, the regulation of the water contact angle according to the present invention has been made in view of not only the adhesion of the resin with the active material layer or the electrode material layer, but also in view of the adhesion of the conductive substrate with the resin layer. The current collector of the present invention thus regulated with its water contact angle can suitably provide high rate characteristics when used as an electrode structure for batteries and electric-charged parts.

The current collector of the present invention can be obtained by forming a resin layer on at least one side of the conductive substrate, such as the afore-mentioned aluminum foil and the like. This can be achieved by a conventional method, however, it is necessary that the resin layer has the afore-mentioned water contact angle. For example, when the resin layer is formed by coating, the temperature and the time for baking have an influence on the water contact angle. The baking temperature, as the final temperature of the conductive substrate, is preferably 120 to 250° C., and the baking time is preferably 15 to 180 seconds. When the resin layer is formed with such conditions, the water contact angle at its surface can be adjusted to be in the range of 5 degrees or more and 60 degrees or less. Here, since the water contact angle is determined as an overall outcome of various factors such as resin composition, resin density in the resin solution, baking temperature, baking time, baking method and the like, the water contact angle may come out of the afore-mentioned range of 5 degrees or more and 60 degrees or less, even when the baking temperature and the baking time are within the afore-mentioned range. In addition, there may be a case where the water contact angle comes within the afore-mentioned range of 5 degrees or more and 60 degrees or less, even when the baking temperature and the baking time are not within the afore-mentioned range.

In general, the water contact angle tends to become large as the baking temperature is raised and the baking time is made longer. Therefore, in order to obtain a resin layer having the water contact angle within the range of 5 degrees or more and 60 degrees or less, the resin layer is formed with a particular condition first, and then the water contact angle of the resin layer thus formed is measured. When the water contact angle measured is less than 5 degrees, the baking temperature is raised or the baking time is made longer. When the water contact angle measured is more than 60 degrees, the baking temperature is reduced or the baking time is made shorter. Accordingly, the conditions are adjusted. The value of the water contact angle cannot be determined merely by the composition of the resin and the baking temperature, however, the water contact angle can be adjusted to the desired value by conducting several trial and errors, when the afore-mentioned method is used.

By using the current collector of the present invention, sufficient adhesion at the interface of the resin layer and the active material layer or in the interface of the resin layer and the electrode material layer can be obtained even when the active material layer or the electrode material layer is formed and is immersed in an electrolyte. In addition, sufficient adhesion can be obtained at the interface of the resin layer and the conductive substrate. Further, large detachment is not observed even after charge and discharge is repeated. Accordingly, sufficient adhesion and superior discharge rate characteristics can be obtained.

In the present invention, the thickness of the conductive resin layer is not particularly limited, however, the thickness is preferably 0.1 μm or more and 5 μm or less, more preferably 0.3 μm or more and 3 μm or less. When the thickness is less than 0.1 μm, unevenness is observed during the formation of the conductive resin layer, generating portions where the conductive substrate cannot be coated, resulting in insufficient battery characteristics. On the other hand, when the thickness exceeds 5 μm, the active material layer or the electrode material layer must be made thin for such excess in the thickness when applied to the non-aqueous electrolyte battery or the electrical storage device described later. Therefore, there are cases where sufficient capacity density cannot be obtained. In addition, concerning the application in lithium ion secondary battery, when the electrode structure is wound together with a separator, cracks are formed in the resin layer at the inner portions of winding having an extremely small radius of curvature. This would lead to generation of detachment and degrades the performance of the non-aqueous electrolyte battery or the electrical storage device.

The manufacturing method of the current collector according to the present invention is not particularly limited, however, it is effective to perform a conventional pretreatment to the conductive substrate itself, in order to improve the adhesion of the surface of the conductive substrate. In particular, when a conductive substrate of aluminum or the like manufactured by rolling is used, there are cases where rolling oil and wear debris are left on the surface. In such cases, adhesion can be improved by removing them. In addition, adhesion can be improved by performing a dry activation treatment such as corona discharge treatment.

Electrode Structure

By forming an active material layer or an electrode material layer on at least one side of the current collector of the present invention, the electrode structure of the present invention can be obtained. The electrode structure for the electrical storage device formed with the electrode material layer will be described later. First, in the case of an electrode structure with an active material layer formed thereon, this electrode structure can be used with a separator, non-aqueous electrolyte solution and the like to manufacture an electrode structure (including parts for batteries) for a non-aqueous electrolyte battery, such as a lithium ion secondary battery. In the electrode structure for the non-aqueous electrolyte battery and the non-aqueous electrolyte battery of the present invention, conventional parts for non-aqueous electrolyte battery can be used for the parts other than the current collector. Here, in the present invention, the active material layer formed as the electrode structure may be the ones conventionally proposed for the non-aqueous electrolyte battery. For example, positive electrode structure of the present invention can be obtained by coating with a paste the current collector of the present invention which uses aluminum, followed by drying. Here, the paste for the positive electrode structure is obtained by using $LiCoO_2$, $LiMnO_2$, $LiNiO_2$ and the like as an active material and using carbon black such as acetylene black and the like as a conductive material, and dispersing the active material and the conductive material in PVDF as a binder. A negative electrode structure of the present invention can be obtained by coating an active material layer forming material with a paste, followed by drying. The current collector for the negative electrode of the present invention uses copper. Here, the paste for the negative electrode structure is obtained by using black lead (graphite), graphite, mesocarbon microbead and the like as an active material, dispersing the active material in CMC as a thickening agent, and then mixing the resulting dispersion with SBR as a binder.

Non-Aqueous Electrolyte Battery

The present invention may be a non-aqueous electrolyte battery. In such case, there is no particular limitation except that the current collector of the present invention is used. For example, the non-aqueous electrolyte battery of the present invention can be obtained by sandwiching a separator immersed in an electrolyte solution for non-aqueous electrolyte battery containing non-aqueous electrolyte, in between the afore-mentioned positive electrode structure and the negative electrode structure having the current collector of the present invention as a structure component. As the non-aqueous electrolyte and the separator, the conventional ones for non-aqueous electrolyte battery can be used. The electrolyte solution can use carbonates, lactones or the like as a solvent. For example, $LiPF6$ or $LiBF4$ as an electrolyte can be dissolved in a mixture of EC (ethylene carbonate) and EMC (ethyl methyl carbonate) and used. As the separator, a membrane made of polyolefin having microporous can be used for example.

Electrical Storage Device (Electrical Double Layer Capacitor, Lithium Ion Capacitor and the Like)

Regarding the electrical double layer capacitor, lithium ion capacitor and the like of the present invention, the current collector of the present invention can be applied to an electrical storage device of an electrical double layer capacitor, lithium ion capacitor and the like, which require charge and discharge with a large current density at high speed. The electrode structure for the electrical storage device of the present invention can be obtained by forming an electrode material layer on the current collector of the present invention. The electrical storage device for the electrical double layer capacitor, lithium ion capacitor and the like can be manufactured with the obtained electrode structure, a separator, and an electrolyte solution. In the electrode structure and the electrical storage device of the present invention, conventional parts for the electrical double layer capacitor and lithium ion capacitor can be used for the parts other than the current collector.

The electrode material layers of the positive electrode and the negative electrode can both be structured with an electrode material, a conductive material, and a binder. In the present invention, the electrical storage device can be obtained by first forming the afore-mentioned electrode material layer onto at least one side of the current collector of the present invention to give the electrode structure. Here, as the electrode material, the ones conventionally used as the electrode material for the electrical double layer capacitor or for the lithium ion capacitor, can be used. For example, carbon powders such as activated charcoal and black lead (graphite), and carbon fibers can be used. As the conductive material, carbon blacks such as acetylene black and the like can be used. As the binder, PVDF (polyvinylidene fluoride) and SBR (styrene butadiene rubber) can be used for example. In addition, the electrical storage device of the present invention can construct an electrical double layer capacitor or a lithium ion capacitor by fixing a separator in between the electrode structures of the present invention, and then immersing the separator in the electrolyte solution. As the separator, a membrane made of polyolefin having microporous, a non-woven fabric for an electrical double layer capacitor, and the like can be used for example. Regarding the electrolyte solution, carbonates and lactones can be used as the solvent for example, and tetraethylammonium salt, triethylmethylammonium salt and the like can be used as the electrolyte, and hexafluorophosphate, tetrafluoroborate and the like can be used as the negative ion. Lithium ion capacitor is structured by combining a positive electrode of a lithium ion battery and a positive electrode of an electrode double layer capacitor. There is no particular limitation with respect to the manufacturing method, except that the current collector of the present invention is used.

EXAMPLES

<1. Evaluation of Current Collector>
<Preparation of Current Collector>

The resin and the organic acid as shown in Table 1 were formulated by the amount as shown in Table 1, and were dissolved in normal methyl 2-pyrrolidone (NMP), followed by the addition of acetylene black with the formulation amount as shown in Table 1. The mixture was dispersed for 8 hours by using a ball mill to obtain a coating. The coating thus obtained was coated on one side of an aluminum foil with a thickness of 20 μm (JIS A1085) by using a bar coater, and was then baked in accordance with the conditions shown in Table 1. The temperatures shown in Table 1 are all final temperature of the conductive substrate.

<Thickness of Resin Layer>

Regarding the thickness of the resin layer, film thickness measuring machine "HAKATTARO G" (available from SEIKO-em) was used to calculate the thickness of the resin layer as a difference in the thickness between the portion formed with the resin layer and the portion without the resin (portion only with the aluminum foil).

<Electrical Resistance of Resin Layer>

A 20 mm-cube block made of copper was placed on the coating (the surface which comes in contact with the coating was mirror finished). The electrical resistance between the aluminum foil and the copper block was measured with the condition in which a load of 700 gf was applied.

<Water Contact Angle>

Water contact angle was obtained using a contact angle meter (Drop Master DM-500, available from Kyowa Interface Science Co., LTD.). First, 2 µl of water droplets were adhered on the surface of the resin layer in a thermostatic chamber at 23° C., and then the contact angle after 2 seconds was measured by θ/2 method.

<2. Evaluation of Discharge Rate Characteristics and Electrode Lifetime of Lithium Ion Battery>

<Preparation of Lithium Ion Battery>

As a positive electrode, a paste prepared by dispersing $LiCoO_2$ as an active material and acetylene black as a conductive material in PVDF (polyvinylidene fluoride) as a binder was coated on each of the afore-mentioned current collectors so as to have a thickness of 70 µm. As a negative electrode, a paste prepared by dispersing black lead (graphite) as an active material in CMC (carboxymethyl cellulose) and then adding SBR (styrene butadiene rubber) as a binder was coated on a copper foil with a thickness of 20 µm so as to have a thickness of 70 µm. A microporous separator made of polypropylene was sandwiched by these electrode structures, and was then cased in the battery casing to obtain a coin battery. A 1 mol/L solution of LiPF6 in EC (ethylene carbonate) and EMC (ethylmethyl carbonate) was used as the electrolyte solution.

<Method for Evaluating Discharge Rate Characteristics>

Discharge capacity of these lithium ion batteries (Value relative to that at 0.2 C, unit: %) was observed for the discharge current rate of 1 C, 5 C, 10 C, and 20 C, when the upper voltage limit of charged state was 4.2 V, charge current was 0.2 C, discharge final voltage was 2.8 V, and the temperature was 25° C. (Here, 1 C is the value of the current (A) when the current capacity (Ah) of the battery is taken out in 1 hour (h). At 20 C, the current capacity of the battery can be taken out in ½0 h=3 min. On the other hand, the battery can be charged in 3 minutes.)

<Method for Evaluating Lifetime of Battery>

The battery was first charged at an electrolyte solution temperature of 40° C., upper limit voltage of 4.2V, and a charging current of 20 C. Then the battery was discharged to a final voltage of 2.8V, at a discharging current of 20 C. Number of cycles when the discharge capacity reaches 60% of the discharge capacity of the first cycle was observed (maximum 500 cycles), and was evaluated in accordance with the following criteria.

A: 500 cycles or more
B: 450 cycles or more and less than 500 cycles
C: 400 cycles or more and less than 450 cycles
D: less than 400 cycles <3. Evaluation of Discharge Rate Characteristics and Electrode Lifetime of Electrical Double Layer Capacitor>

<Preparation of Electrical Double Layer Capacitor>

A paste was prepared by dispersing activated charcoal as an electrode material and Ketjen black as a conductive material in PVDF as a binder. The paste thus obtained was coated on the current collector electrode so that the thickness of the coating is 80 µm, to give the positive and negative electrode structures. A non-woven fabric for an electrical double layer capacitor immersed in the electrolyte solution was sandwiched and fixed by two of these electrode structures, and thus the electrical double layer capacitor was structured. A solution obtained by adding 1.5 mol/L solution of TEMA (triethylmethyl ammonium) and tetrafluoroboric acid in propylene carbonate as a solvent was used as the electrolyte solution.

<Method for Evaluating Discharge Rate Characteristics>

Discharge capacity of these electrical double layer capacitors (relative to 1 C, unit: %) was observed for the discharge current rate of 100 C, 300 C, and 500 C, when the upper voltage limit of charged state was 2.8 V, charge current was 1 C, condition for the completion of charging was 2 hours, discharge final voltage was 0 V, and the temperature was 25° C.

<Method for Evaluating Lifetime of Electrode>

The electrical double layer capacitor was first charged at an electrolyte solution temperature of 40° C., upper limit voltage of 2.8V, and a charging current of 500 C. Then the battery was discharged to a final voltage of 0V, at a discharging current of 500 C. Number of cycles when the discharge capacity reaches 80% of the discharge capacity of the first cycle was observed (maximum 5000 cycles), and was evaluated in accordance with the following criteria.

A: 5000 cycles or more
B: 4500 cycles or more and less than 5000 cycles
C: 4000 cycles or more and less than 4500 cycles
D: less than 4000 cycles The results of evaluation are shown in Table 1. As shown in Table 1, in all of the Examples where the resin of the resin layer was chitosan derivative (hydroxyalkyl chitosan) and the water contact angle of the surface of the resin layer was 5 degrees or more and 60 degrees or less, superior high rate characteristics and battery lifetime was observed in both of the lithium ion battery and the electrical double layer capacitor. On the other hand, in Comparative Example 1 and Comparative Example 2, which have too small water contact angle, the high rate characteristics were inferior. In addition, Comparative Example 3, which used ethyl cellulose as the resin of the resin layer, showed inferior high rate characteristics.

Here, from the results of Examples 1 to 5, it became apparent that especially superior high rate characteristics can be obtained when the water contact angle is 15 degrees or more and 40 degrees or less. In addition, from the results of Examples 6 to 9, it became apparent that especially superior high rate characteristics can be obtained when the content of the conductive material was 50 to 80 parts by mass with respect to 100 parts by mass of the resin.

TABLE 1

| | | Resin | | | Organic Acid | | Conductive Material |
|---|---|---|---|---|---|---|---|
| | | Type | Weight Average Molecular Weight | Formulation (parts by mass) | Type | Formulation (parts by mass) | Formulation (parts by mass) |
| Example | 1 | Hydroxyalkyl Chitosan | 80000 | 50 | Pyromellitic Acid | 50 | 70 |
| | 2 | Hydroxyalkyl Chitosan | 80000 | 50 | Pyromellitic Acid | 50 | 70 |
| | 3 | Hydroxyalkyl Chitosan | 80000 | 50 | Pyromellitic Acid | 50 | 70 |
| | 4 | Hydroxyalkyl Chitosan | 80000 | 50 | Pyromellitic Acid | 50 | 70 |
| | 5 | Hydroxyalkyl Chitosan | 80000 | 50 | Pyromellitic Acid | 50 | 70 |
| | 6 | Hydroxyalkyl Chitosan | 80000 | 50 | Pyromellitic Acid | 50 | 30 |
| | 7 | Hydroxyalkyl Chitosan | 80000 | 50 | Pyromellitic Acid | 50 | 50 |
| | 8 | Hydroxyalkyl Chitosan | 80000 | 50 | Pyromellitic Acid | 50 | 80 |
| | 9 | Hydroxyalkyl Chitosan | 80000 | 50 | Pyromellitic Acid | 50 | 100 |
| | 10 | Hydroxyalkyl Chitosan | 80000 | 50 | Trimellitic Acid | 50 | 70 |
| | 11 | Hydroxyalkyl Chitosan | 80000 | 50 | Terephthalic Acid | 50 | 70 |
| Comparative Example | 1 | Hydroxyalkyl Chitosan | 80000 | 50 | Pyromellitic Acid | 50 | 60 |
| | 2 | Hydroxyalkyl Chitosan | 80000 | 50 | Pyromellitic Acid | 50 | 60 |
| | 3 | Ethyl Cellulose | 70000 | 60 | Terephthalic Acid | 50 | 60 |

| | | Application Conditions | | | Electrical | Water | Grade of | Discharge Rate Characteristics | | | | | | Lifetime | |
|---|---|---|---|---|---|---|---|---|---|---|---|---|---|---|---|
| | | Baking Temperature (°C.) | Baking Time (sec.) | Film Thickness (μm) | Resistance of Resin Layer (mΩ) | Contact Angle (degrees) | Discharge Rate Characteristics | Lithium Ion Battery | | | Electrical Double Layer Capacitor | | | Lithium Ion Battery | Electrical Double Layer Capacitor |
| | | | | | | | | 5 C | 10 C | 20 C | 100 C | 300 C | 500 C | | |
| Example | 1 | 120 | 15 | 2.1 | 324 | 6 | B | 91 | 86 | 83 | 96 | 88 | 84 | A | A |
| | 2 | 150 | 100 | 2.1 | 330 | 15 | A | 98 | 92 | 87 | 97 | 94 | 88 | A | A |
| | 3 | 200 | 100 | 2.1 | 320 | 26 | A | 98 | 94 | 88 | 98 | 94 | 89 | A | A |
| | 4 | 250 | 100 | 2.1 | 345 | 40 | A | 99 | 92 | 87 | 97 | 93 | 87 | A | A |
| | 5 | 180 | 180 | 2.1 | 350 | 43 | B | 92 | 87 | 83 | 97 | 89 | 83 | A | A |
| | 6 | 200 | 100 | 2.2 | 674 | 58 | B | 93 | 86 | 81 | 96 | 87 | 84 | A | A |
| | 7 | 200 | 100 | 2.4 | 456 | 39 | A | 97 | 93 | 86 | 98 | 92 | 87 | A | A |
| | 8 | 200 | 100 | 2.3 | 294 | 23 | A | 98 | 93 | 87 | 98 | 92 | 88 | A | A |
| | 9 | 200 | 100 | 2.2 | 310 | 53 | B | 93 | 88 | 82 | 97 | 88 | 83 | A | A |
| | 10 | 200 | 100 | 2.1 | 336 | 36 | B | 97 | 92 | 88 | 97 | 93 | 86 | A | A |
| | 11 | 200 | 100 | 2.3 | 329 | 42 | B | 97 | 94 | 86 | 98 | 94 | 89 | A | A |
| Comparative Example | 1 | 120 | 10 | 2.2 | 326 | 4 | D | 76 | 68 | 57 | 87 | 67 | 56 | D | D |
| | 2 | 250 | 600 | 2.2 | 331 | 62 | D | 78 | 66 | 58 | 88 | 69 | 57 | D | D |
| | 3 | 200 | 100 | 2.3 | 2870 | 45 | E | 73 | 61 | 50 | 88 | 62 | 53 | D | D |

EXPLANATION OF SYMBOLS

1: Current Collector
3: Conductive Substrate
5: Resin Layer (Resin Layer for Current Collector)
7: Electrode Structure
9: Active Material Layer or Electrode Material Layer

The invention claimed is:

1. A current collector comprising a resin layer possessing conductivity formed on at least one side of a conductive substrate, wherein
the resin layer contains a chitosan-based resin and a conductive material, and has a surface having a water contact angle of 5 degrees or more and 60 degrees or less, the water contact angle being measured by θ/2 method in a thermostatic chamber at 23° C.

2. The current collector of claim 1, wherein the water contact angle is 15 degrees or more and 40 degrees or less.

3. The current collector of claim 1, wherein the content of the conductive material is 30 to 100 parts by mass with respect to 100 parts by mass of the chitosan-based resin.

4. The current collector of claim 3, wherein the content of the conductive material is 50 to 80 parts by mass with respect to 100 parts by mass of the chitosan-based resin.

5. The current collector of claim 1, wherein
the chitosan-based resin comprises a chitosan derivative and an organic acid, and
the content of the organic acid is 20 to 300 parts by mass with respect to 100 parts by mass of the chitosan derivative.

6. The current collector of claim 5, wherein the content of the organic acid is 50 to 150 parts by mass with respect to 100 parts by mass of the chitosan derivative.

7. The current collector of claim 1, wherein the chitosan derivative has a weight average molecular weight of 30,000 to 500,000.

8. An electrode structure comprising:
an active material layer or an electrode material, formed on the resin layer of the current collector of claim 1.

9. A non-aqueous electrolyte battery or an electrical storage device, comprising the electrode structure of claim 8.

* * * * *